Sept. 4, 1923.
R. R. REID ET AL
1,466,755
COMBINED REFRIGERATOR SHOWCASE AND COUNTER
Filed April 7, 1922    6 Sheets-Sheet 3
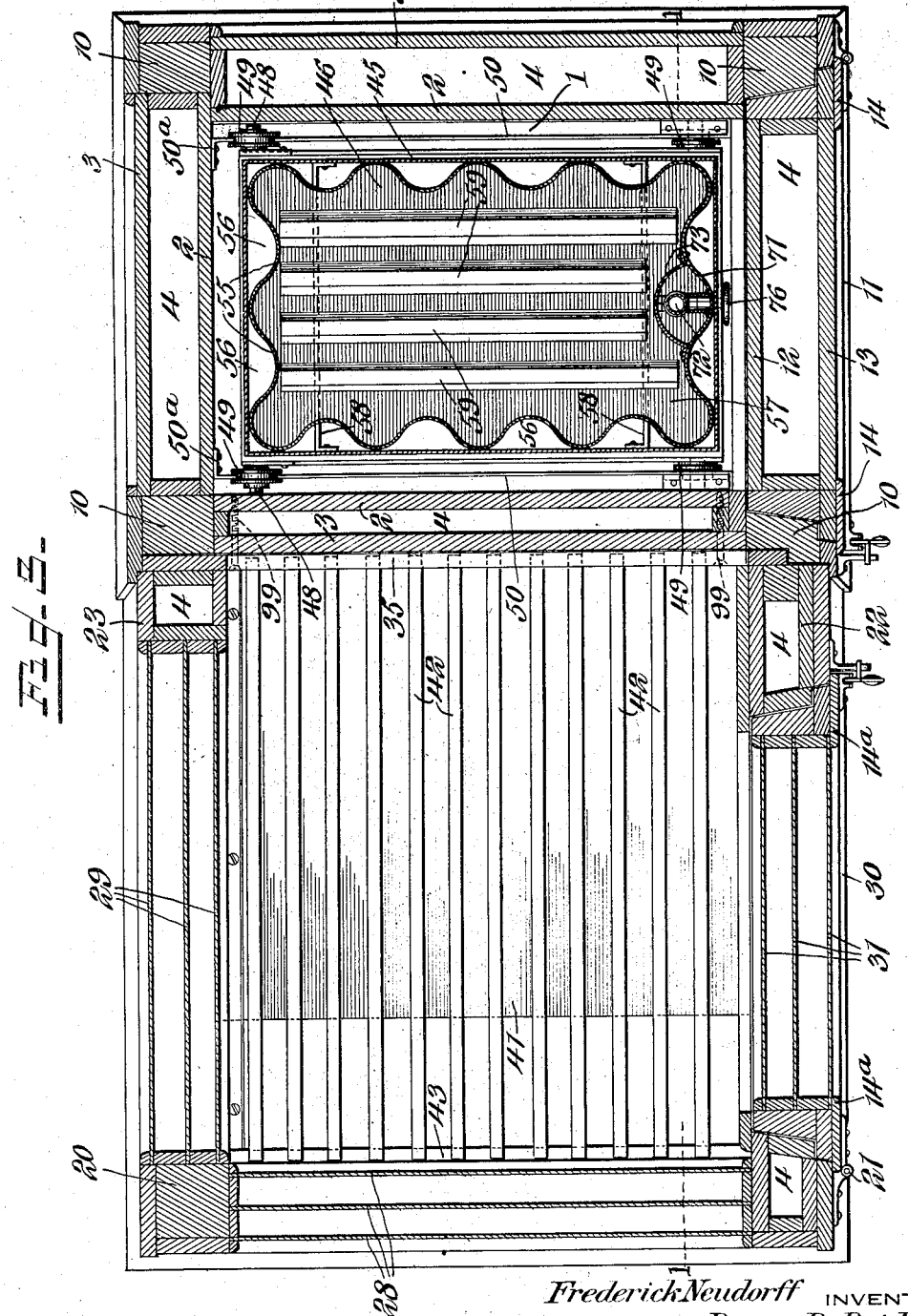
WITNESSES
Charles H. Ourand
Harry E. Seidel
INVENTORS
Frederick Neudorff
Remer R. Reid
BY
ATTORNEY Sept. 4, 1923. 1,466,755
R. R. REID ET AL
COMBINED REFRIGERATOR SHOWCASE AND COUNTER
Filed April 7, 1922 6 Sheets-Sheet 4
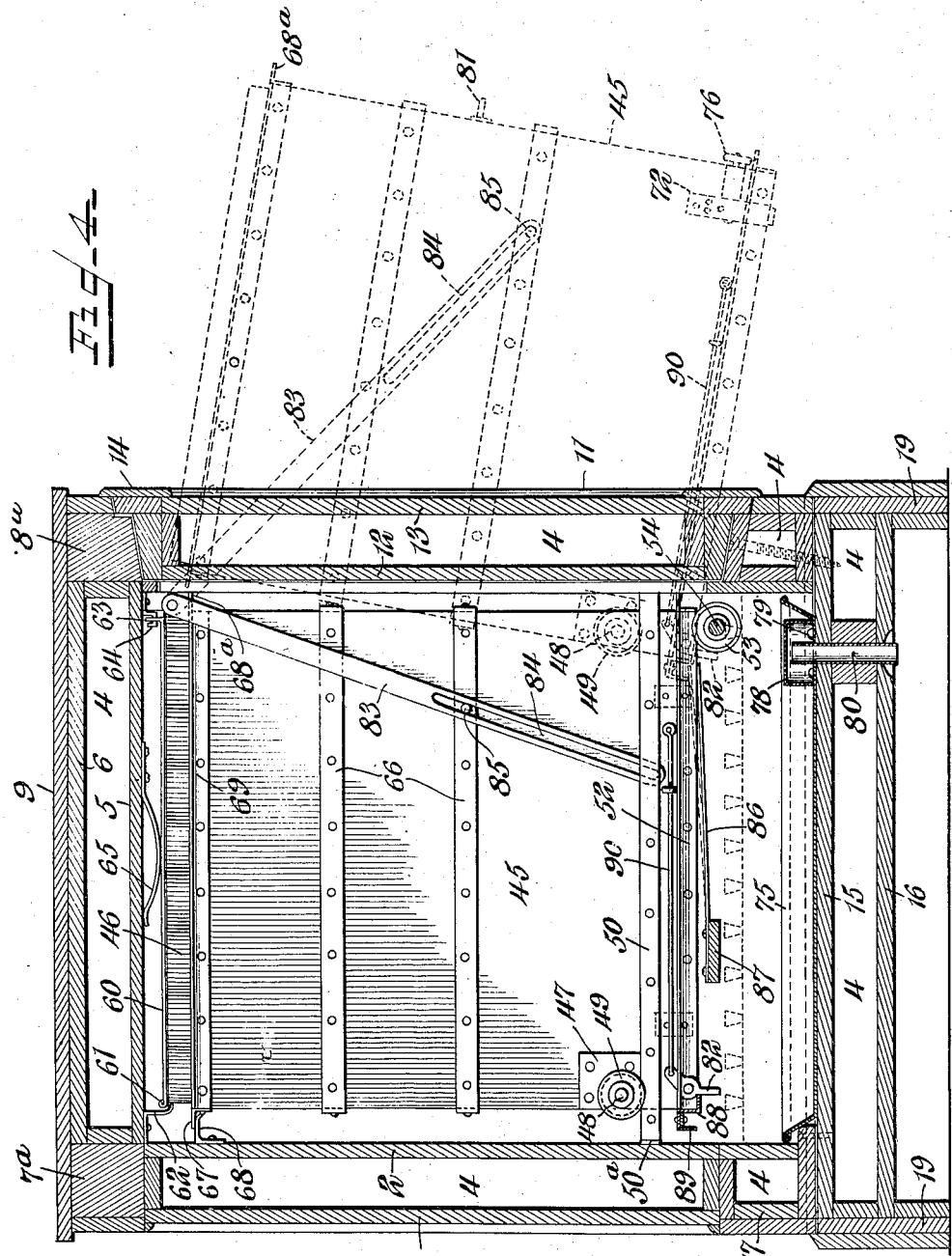
Frederick Neudorff & Remer R. Reid
INVENTORS
WITNESSES
BY
ATTORNEY

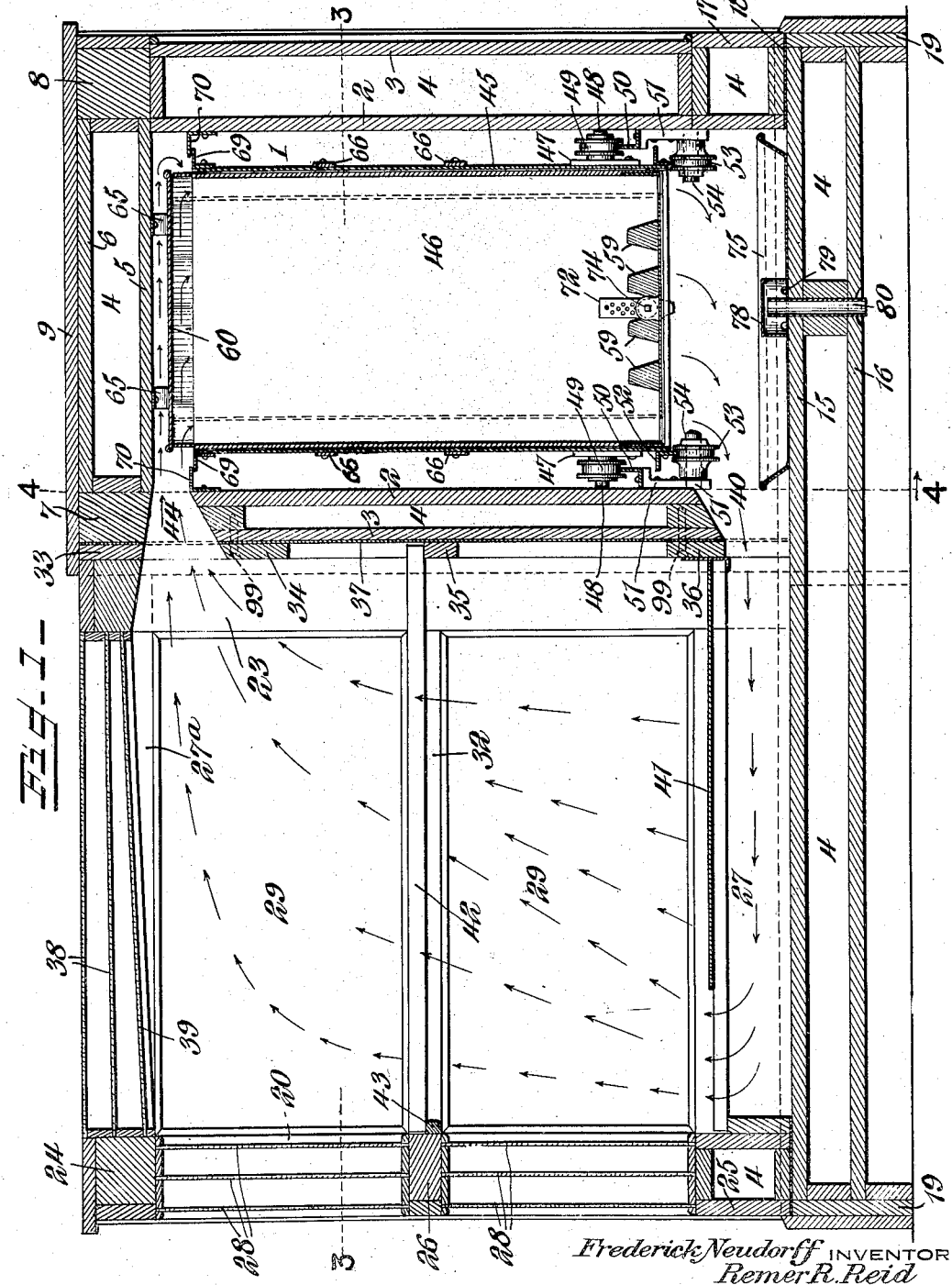

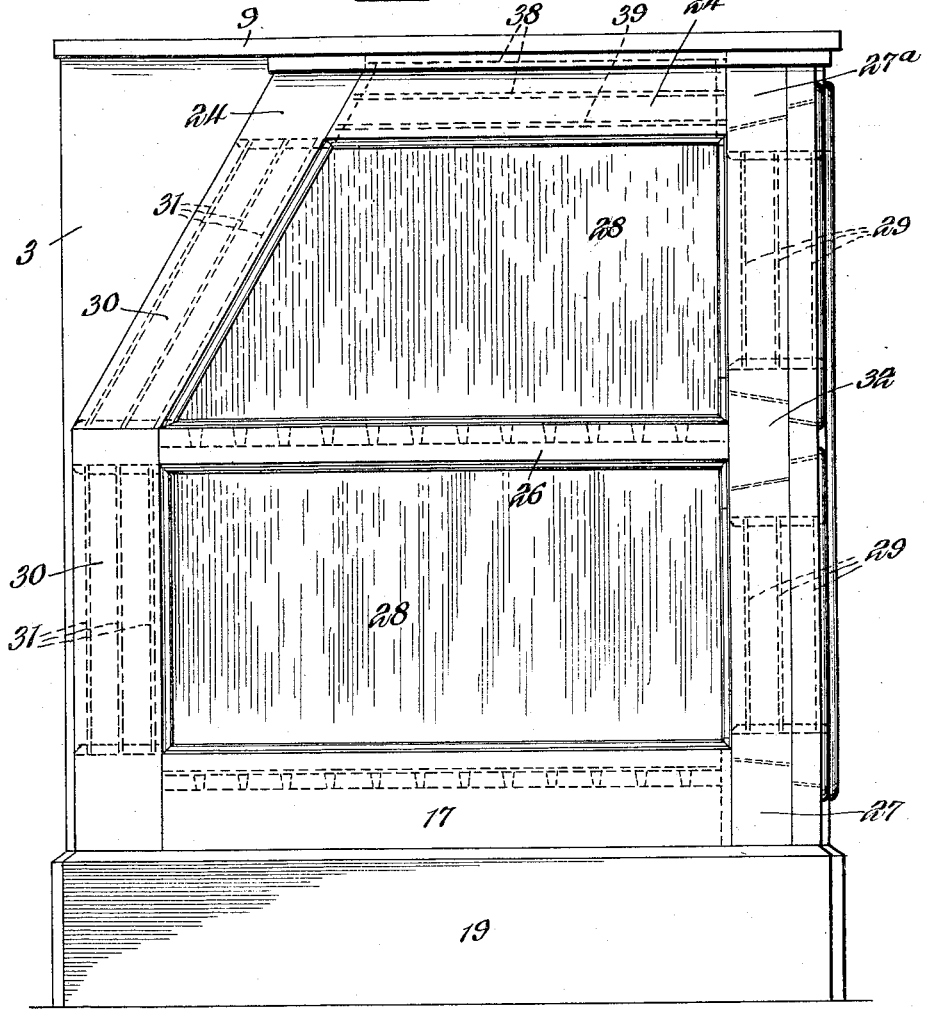

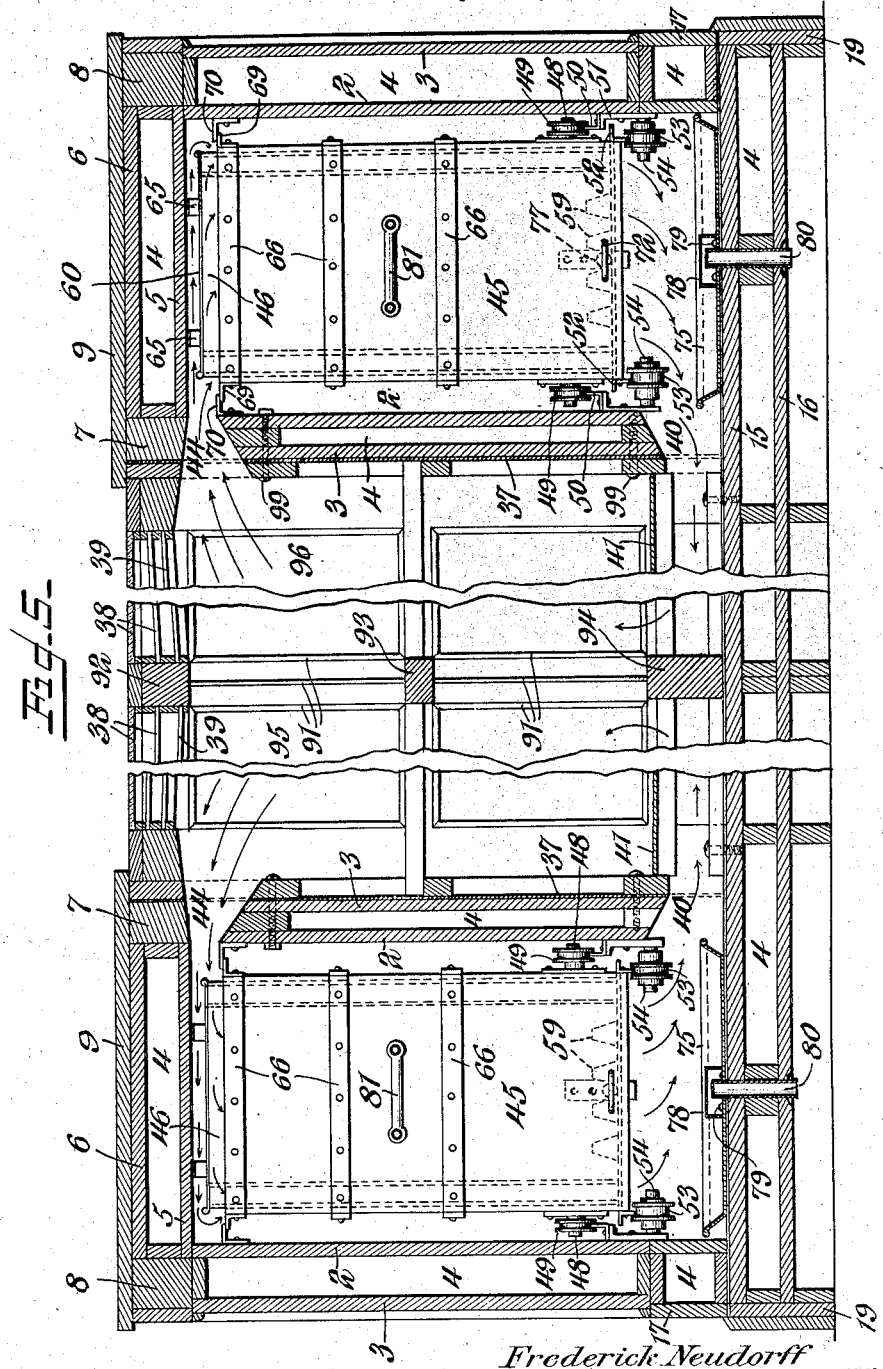

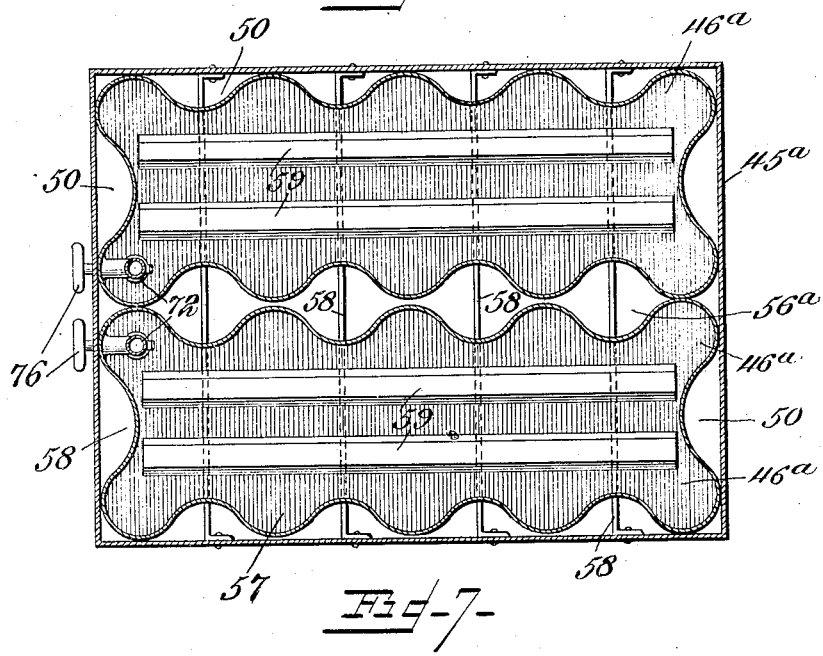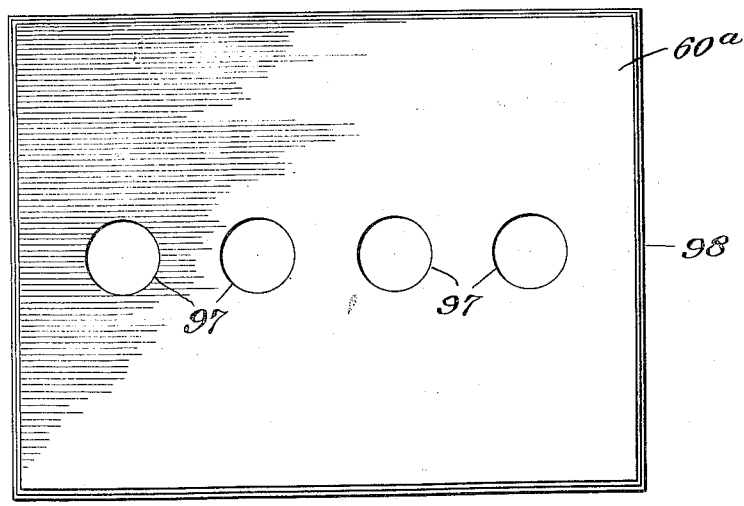

Patented Sept. 4, 1923.

1,466,755

UNITED STATES PATENT OFFICE.

REMER RAIMOND REID AND FREDERICK NEUDORFF, OF ATLANTA, GEORGIA.

COMBINED REFRIGERATOR SHOW CASE AND COUNTER.

Application filed April 7, 1922. Serial No. 550,497.

*To all whom it may concern:*

Be it known that we, REMER R. REID and FREDERICK NEUDORFF, citizens of the United States, residing at Atlanta, in the county of Fulton and State of Georgia, have invented a new and useful Combined Refrigerator Show Case and Counter, of which the following is a specification.

This invention relates to refrigerating devices, and more particularly to a combination refrigerator show-case and counter adapted to contain meats or other perishable goods for display purposes.

The usual practice is to drain from the refrigerator all water, or a greater part of the water, which results from the melting ice, or the brine, thereby causing an uneven temperature throughout the refrigerator and maintaining colder regions of the refrigerator plant at lower level than is desirable for an efficient working of the plant.

An object of our invention is to eliminate this undesirable feature by maintaining a more even temperature throughout the refrigerator, with less consumption of ice for a longer period of time than with other devices. To this end, we retain substantially all of the resultant water caused by the melting ice, or the brine in a container and upon which the ice floats, so that the ice will be held at a high point in the refrigerator, against which ice the warm incoming air from the counter is directed and is thereby rapidly chilled. The continued melting of the ice at the top produces further cold water or brine and which, as is well known, settles to the bottom of the container, forcing the warmer liquids to the top in close association with the melting ice. By this means, a uniform temperature is maintained in the container filled with the cooling medium.

In order to properly cool the air from the counter which passes through the refrigerator, flues are formed by corrugating the walls of the container filled with the cooling medium, and the corrugated side walls of the container being enclosed by a casing. In this manner, a greater surface of the chilled walls of the container are exposed to the air, whereby a more efficient circulation of the air through the counter and refrigerator is maintained, and the air is cooled with a minimum amount of ice and for a longer period of time than by other methods.

Means are also provided whereby the casing enclosing the container is mounted upon tracks within the cooling compartment of the refrigerator, and which casing may be withdrawn through a door of the cooling compartment and suspended in projecting relation with the compartment, whereby the container within the casing may be emptied or filled with a fresh cooling medium. Means are also employed for preventing the casing from falling out of the compartment when projected from the door, in combination with an automatically operated means for preventing backsliding of the casing when in projected position, the last-mentioned means being automatically operable upon the tilting of the container for releasing the same to permit the casing to be returned within the cooling compartment.

A relatively stationary cover is mounted upon the top wall of the cooling compartment, and automatically closes or opens the top as the casing is moved inwardly or outwardly of the cooling compartment, the said cover being adapted to seal the opening of the container to the air in the cooling compartment.

A plurality of counters are employed forming a single structure, and which are connected to individual cooling compartments, whereby one of the counters may be opened without loss of chilled air from the other counter.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 1 is a longitudinal vertical section of a refrigerator counter taken along the line 1—1 of Fig. 3.

Fig. 2 is an end view of the counter.

Fig. 3 is a horizontal section along the line 3—3 of Fig. 1.

Fig. 4 is a transverse vertical section taken along the line 4—4 of Fig. 1.

Fig. 5 is a vertical longitudinal section of a double refrigerator counter.

Fig. 6 is a horizontal section of a double ice container.

Fig. 7 is a plan view of a cover for the same.

Referring more particularly to the drawings, a cooling compartment 1 is formed by inner side walls 2 and outer walls 3, spaced from the inner walls 2 by means of blocks, the space 4 between the walls being filled with insulating material, such as cork. A top wall of the cooling compartment is formed by an inner wall 5 spaced from an outer wall 6 by means of blocks and supported upon the inner side walls 2. The space 4 between the walls 5 and 6 is likewise filled with an insulating material such as cork. Horizontal side members 7 and 8, respectively, are mounted at the upper left and right hand corners of the cooling chamber. Horizontal rear and front members 7<sup>a</sup> and 8<sup>a</sup> are secured in position and form the upper rear and front edges of the compartment. A cover plate 9 is mounted upon the outer wall 6, embracing and overlapping the horizontal members 7, 8, 7<sup>a</sup> and 8<sup>a</sup>.

At each corner of the compartment are mounted vertical posts 10, to which are secured the inner and outer side and rear walls 2 and 3. The front corner posts and the horizontal member 8<sup>a</sup> have their inner faces inclined to conform to the oppositely inclined mating faces of a door 11 which closes the entrance to the cooling chamber. The door has inner and outer walls 12 and 13, respectively, spaced apart by means of vertical and horizontal end blocks, the spaces 4 between the walls 12 and 13 being filled by some insulating material, such as cork. Strips of material 14, preferably of wood, are mounted at the outer edge of the outer wall of the door, and overlap the jambs of the door to make a more air-tight closure and thereby prevent cold air from escaping from the refrigerating chamber 1.

The refrigerating chamber has its side and rear walls mounted in any approved manner upon the inner wall 15 of the floor, which is spaced by means of blocks from the outer wall 16 of the floor, the space 4 between the walls 15 and 16 being filled by some insulating material such as cork. As shown in Fig. 1, the outer side rear walls of the chamber are connected to the wall 15 of the floor by means of a hollow support 17 formed of lengths of board secured together and having a longitudinal opening 4 to be filled with cork. Between the support 17 and the wall 15 of the floor is inserted a felt strip 18.

The floor of the refrigerator counter is supported by means of legs 19, built up of several pieces of material, as shown in Fig. 1, which rest upon the floor of the building. The floor of the cooling chamber is extended beyond the inner side wall of the cooling chamber sufficiently to support a counter.

As shown in Fig 3, the counter is built up of four vertical corner posts, an outer rear corner post 20 being solid, while the other corner posts 21, 22, 23 are built up of four pieces of material having a vertical passage 4 therethrough which is filled with insulating material, such as cork. The front corner posts 21 and 22 are formed of two sections, a lower vertical section and an upper rearwardly inclined section, for, as shown in Fig. 2, the upper half of the front of the counter is inclined towards the rear. Connected to the corner posts 20 and 21, in any approved manner, are upper and lower horizontal end members 24 and 25, respectively, and an intermediate horizontal member 26, which, together with the end posts, form the end framework of the counter. The members 24 and 26 are solid, while the base member 25 is hollow, being constructed of a number of pieces of material and provided with a hollow passage 4 filled by insulating material. The rear end of the counter is provided with a base member 27, Fig. 1, mounted on the inner wall 15 of the floor, an upper rear horizontal member 27<sup>a</sup> and an intermediate member 32, the members being connected in any approved manner at their ends to the rear posts 20 and 23.

The end portion of the counter is closed by two sections of glass of three plates each, designated by the numeral 28, as shown in Fig. 3, thereby forming a triple closure for the end of the counter. The rear end of the counter is likewise closed by two sections of glass of three plates each and designated by the numeral 29, while the doors 30 are constructed of a framework containing each three plates of glass designated by the numeral 31.

The inner end of the counter, which is adjacent to the cooling chamber 1, is provided with spaced horizontal beams 33, 34, 35 and 36, secured to the posts 22 and 23. (Fig. 1). A felt sheet 37 is mounted upon the outer surface of the outer wall 3 of the cooling chamber 1. Beams 34 and 36 are secured to the outer wall 3 by means of bolts or screws 99, and by this means the counter is connected to the cooling compartment 1.

The top of the counter is closed by means of two parallel horizontally disposed glass plates 38, and an inclined glass plate 39 which is connected in any improved manner to the upper framework of the counter. (Fig. 1).

Secured adjacent to the bottom of the counter is a plate or metal grating 41, which extends only part way across the counter and causes the cold air, as indicated in Fig. 1, coming from the refrigerating chamber 1, through a passage 40, which connects the lower ends of the cooling chamber 1 and the counter, to travel to the farther end of the counter, where it is directed upwardly beyond the edge of the grating 41 through the spaces between the bars 42 disposed longitudinally of the counter and resting on the transverse bars 43 and 35, said bars 42 forming a supporting shelf. The cold air passes upwardly and is directed by the inclined glass plate 39 through a passage 44, formed at the upper ends of the walls 2 and 3, to the top of the refrigerating chamber 1.

Both of the passages 40 and 44 are flared, as shown in Fig. 1.

The doors 11 and 30, as shown in Fig. 3, are hingedly mounted upon the vertical corner posts 10 and 21, respectively. The doors 30 are similarly provided with overlapping strips 14ª to prevent loss of cold air from the counter.

Within the chamber 1 is a rectangular casing 45 having its top and bottom ends open, and into which is adapted to be inserted a cooling medium container 46 having its side walls corrugated. Upon the lower ends of the side walls of the casing 45 are mounted plates 47, to which are secured in any approved manner axles 48, upon which are mounted grooved rollers 49, the grooves of which are adapted to ride on L-shaped tracks 50 formed of angle iron, which are rigidly connected at their forward ends to brackets 51, mounted upon the inner side walls 2 of the cooling chamber 1, while the rear ends of the tracks are secured at 50ª to the rear wall of the cooling chamber. Upon the extreme lower edges of the side walls of the open-ended casing 45, are mounted angle irons 52, which form tracks adapted to ride in the grooves of rollers 53, rotatably mounted on axles 54 secured in spaced relation on the brackets 51. The casing 45 is thus supported and slidably mounted upon the cooperating pairs of tracks and rollers.

As has been stated, within the casing 45 is removably mounted a cooling medium container 46, having the walls corrugated, as shown at 55 in Fig. 3, so that the concave portions of the walls of the container 46 form with the side walls of the casing 45, air flues 56, through which the air coming from the top of the counter is adapted to pass to the bottom of the cooling chamber.

The bottom 57 of the container 46 rests on bars 58 secured edgewise to the lower ends of the side walls of the casing 45. Longitudinal tapered bars 59 are secured to the bottom 57 of the container 46, and provide a protection against injury to the bottom of the container when a block of ice is placed within the container, and also forms a supporting means for the same. (Figs. 3, 5 and 6.)

As shown in Fig. 4, a top 60 is provided along its periphery with a rib 61, which is adapted to be engaged at one end by hook-like elements 62, mounted to the under side of the inner wall 5 of the top of the cooling chamber. At the other end are provided a perforated lug 63 and hook 64, so that the top cover 60 for the container 46 is pivotally supported independently of the container, but is maintained in engagement with the hook element 62 and the top of the container by means of springs 65 secured to the wall 5, and pressing downwardly upon the cover 60 of the container. The container 46 is removably mounted within the casing 45 in order that said container may be withdrawn and cleaned when necessary.

The casing 45 is bound by straps 66 to form a more rigid structure. (Fig. 5.) To the rear wall of the casing 45 is secured an angle bar 67 (Fig. 4), which is adapted to slide upon an angle bar 68, secured to the rear inner wall 2 of the cooling chamber. At the upper edges of the side walls of the casing 45 are secured angle irons 69, adapted to engage beneath an angle arm 70 mounted upon the side walls 2 of the cooling chamber. (Fig. 5.) An angle iron 68ª, secured to the upper front edge of the casing 45, has an edge of the horizontal member of said angle arm in abutting relation with the inner wall 12 of the door 11 when said door is closed. (Fig. 4.)

The object of the cooperating angle irons or bars 67, 68, 68ª and 69, 70, which extend all around the casing 45, is to close the space between the casing and the chamber and prevent warm air coming from the counter from circulating between the outer walls of the casing 45 and the inner walls 2 of the cooling chamber, whereby the air as it enters the cooling chamber will pass into the casing 45 at the top, and escape through the flues 56 formed by the corrugated side and end walls of the container 46 and the inner wall of the casing 45.

The bottom 57 of the container 46 is cut out to conform to the corrugation of the side walls thereof so that the bottom of the flues 56 will be open to the bottom of the cooling chamber whereby the air may pass from these flues to the counter. (Figs. 3 and 6.)

Within the central convex portion of the corrugated front wall 71 is located a perforated drain pipe 72, which opens through the bottom 57 of the container 46, the open bottom end of the pipe lying substantially flush with said bottom. (Figs. 1 and 3).

A curved guard 73 partially surrounds the drain pipe 72, and is connected to the inner surface of the front wall of the container 46 and extends to the top of the drain pipe 72, to enclose the same and protect the drain pipe from damage by ice moving within the container 46.

A stem 74 connected to a valve which controls the flow of liquid from the container 46 to the pan 75, mounted upon the inner wall 15 of the floor of the refrigerator counter, is operated by a key 76 insertable through an opening 77 within the front wall of the casing 45, as shown in dotted lines in Fig. 5.

Centrally of the pan 75 is mounted an air trap 78 provided with perforations 79 at its bottom, through which the water or brine in the pan 75 is adapted to pass and fill the trap 78 and then pass through the open upper end of a drain pipe 80 to the exterior of the refrigerator. (Figs. 1 and 5).

The casing 45, by reason of its being supported on the rollers 49 and tracks 50, and the cooperating tracks 52 and rollers 53, is movable within the cooling chamber and outwardly of the same, as shown in dotted lines, Fig. 4. When it is desired to empty or refill the container 46, the door 11 of the cooling chamber is opened, and the handle 81 on the side of the casing 45 is grasped and a pull upon the same causes the casing 45 to move outward of the cooling chamber 1, until the pawl 82 engages with the grooved wheel 53, and prevents any further projection of the casing 45. Rods 83 pivotally connected to the inner walls of the cooling chamber at their upper front ends, and provided with a slot 84, in which the pin 85 secured to the strap 66 rides, serve to support the casing 45 in its projected and in a downwardly tilted position, the pin 85 moving downwardly to the lower end of the slot 84 in the pivoted arms 83. (Fig. 4).

To prevent backsliding of the casing 45, a spring 86 mounted upon a transverse bar 87 secured within the cooling chamber is adapted to have its outer free end automatically engage an angle bar 88 mounted upon the lower rear bottom edge of the casing 45, when the casing is projected from the cooling chamber. The free end of said spring is held in place against the angle bar 88 by a downwardly depending flange 89 engaging the end of the spring. (Fig. 4).

When it is desired to return the casing 45 to its position within the cooling chamber 1, the outer end of the casing is tilted upwardly, whereby the flange 89 will depress the end of the spring 86 and move it beneath the angle bar 88 so that the casing will be free to move rearwardly without any interference from the spring 86.

If it be desired to remove the casing 45 entirely from the cooling chamber 1, the rod 90 is operated to oscillate the pawl 82 and move the same away from the wheel 53. Before removal of the casing, the pins 85 must be released from the slots 84 of the pivoted supporting rods 83.

As the casing 45, and likewise the container 46, are moved outwardly from the cooling chamber, the cover 60 will be maintained in position within the cooling chamber by means of the hook-shaped members 62 and the perforated lugs 63 and the hooks 64. When the casing and container are returned to their normal position within the cooling chamber, the cover 60 automatically seats on the upper edge of the container 46, while the spring 65 will force the cover downwardly in close contact with the same.

In Fig. 5 is shown a refrigerator show case and counter constructed to have at its opposite ends refrigerating chambers 1, which are identical in every detail with the refrigerator chambers described with reference to Figs. 1 to 4, inclusive. The counters have a common central partition which separates the counters from each other and comprises two sections of glass of three plates 91 each. The transverse horizontal members 92, 93 and 94 support the glass plates 91, and together with said plates form the independent counters 95, 96, so that the doors of each counter may be opened without loss of cold air from the other counter. As shown by the arrows, counter 95 is supplied with cold air from its individual cooling chamber 1, while counter 96 is supplied with cold air from its adjacent cooling chamber.

As shown in Figs. 6 and 7, double ice containers 46ª are located in the single casing 45ª, the bottoms of the containers being adapted to be supported upon a plurality of transverse rods 58 mounted edgewise and transversely of the casing 45ª. In each of the containers 46ª are mounted perforated draining tubes 72, but these tubes are located in the adjacent front corners of the containers 46ª, and which corners are formed by the convexly corrugated portions of the walls of said container, whereby the draining tubes 72 will be protected from blocks of ice which are liable to be shifted in the containers.

In Fig. 7 is shown a single cover plate 60ª for the two containers 46ª having a plurality of perforations 97, which are centrally disposed in said cover and in alinement with the flues 56ª, formed by the concave portions of the adjacent corrugated walls of the pair of containers. The concave end and side walls form, with the casing 45ª, air flues 56ª which are similar in every respect to the flues 56, shown in Figs. 1 to 4, inclusive.

The periphery of the cover 60ª is provided with a bead 98 to stiffen the said cover plate.

In both forms of containers, 46 and 46ª, the tops of the containers project above the tops of the casings 45 and 45ª, respectively, so that warm air coming from the counters will pass into the flues 56 and 56ª, and downwardly, and alongside of the walls of the corrugated container to the bottom of the cooling chambers 1, and thence through the passages 40 to the counters.

The containers 46 and 46ª may be filled with chipped ice and salt, or with a block of ice and salt, or simply a block of ice. As the salt acts upon the ice and causes the same to melt, thereby maintaining the temperature at the freezing point of water, the ice will float upon the brine or water and be carried near the highest point in the container. As the warm air passes from the counters to the cooling chamber 1, it will first reach the upper regions of the containers, which in this case is the coldest part, since the melting of the ice takes place in the higher region of the container. The warm air then passes downwardly through the flues 56 and 56ª, and is thoroughly chilled. The brine formed by the melting of the ice, being colder, and therefore heavier, will fall to the bottom of the container and force the warmer brine upwardly into engagement with the ice. It will be seen that this process is continuous, and the temperature of the top of the container will increase as the ice melts and the brine rises.

The drip pans located below the containers will ordinarily be adapted to catch any loss of brine through leakage or any moisture formed from sweating. If at any time it should be desired to release some of the brine or water, the key 76 may be inserted within the opening 77 in the casing and engage the stem 74, whereby the valve which controls the outflow of the brine through the drain pipe 72 may be operated and permit the brine or water to flow to the drip pan.

By retaining the brine the ice floats on top. That portion of the container where the ice floats is the coldest and the highest part of the container, and by this arrangement the air circulation is always more nearly the same. If the brine is dripping out continuously the ice will descend and remain at the bottom of the container. The brine is only let off when the container is refilled.

What is claimed is:—

1. A refrigerator comprising a cooling chamber, a casing within the chamber and spaced from the walls thereof, a container within the casing having its walls corrugated and adapted to be filled with a cooling medium, a heat insulating partition extending from side to side of the chamber adjacent the casing and spaced from the top and bottom of the chamber, said corrugated walls forming in connection with the casing, flues connected with the spaces above and below the partition, and means provided between the casing and the partition and walls surrounding the same for closing the space therebetween.

2. A refrigerator comprising a cooling chamber, a casing removably mounted within and spaced from the inner walls of the chamber, a container having corrugated walls and adapted to contain a cooling medium, said corrugated walls of the container forming with the casing, flues for the circulation of air, and cooperating means provided on the chamber and casing and extending all around the latter and closing the space between the casing and chamber, whereby the air is caused to pass through said flues.

3. A refrigerator comprising a cooling chamber, a casing within the chamber, a container within the casing having its walls corrugated and adapted to be filled with a cooling medium, said corrugated walls forming with the casing, flues for the circulation of air, and flanges mounted upon the upper end of the casing and cooperating with flanges secured to the walls of the chamber for preventing circulation of air between the walls of the chamber and the side walls of the casing, said casing being removably mounted in said chamber.

4. A refrigerator comprising a cooling chamber, a casing mounted within the chamber, a container adapted to contain a cooling medium and fitted within the casing, means for slidably mounting the casing within the chamber so that it may be moved outside the latter, and a cover for the container mounted on the top wall of the cooling chamber adapted to automatically close the top of the container when said container is moved to its normal position within the cooling chamber.

5. A refrigerator comprising a cooling compartment, a casing slidably mounted within the compartment, a container removably mounted within the compartment and adapted to be filled with a cooling medium, and a spring-pressed cover pivotally mounted on the top wall of the compartment and adapted to be automatically engaged or disengaged from the top of the container when said casing is moved towards or away from its normal position within the compartment.

6. A refrigerator comprising a cooling chamber, a container for holding a supply of cooling medium, a cover for the top of the container, means for connecting the cover to the top of the cooling chamber, resilient means engaging the said cover for holding it down on the container, means for slidably mounting said container within the cooling chamber so that it may be moved into and out of the same, said cover and resilient means maintaining their respective positions within the cooling chamber when the container is moved out.

7. A refrigerator comprisng a cooling chamber, a container for holding a supply of cooling medium, means for pivotally supporting the cover independently of the container, resilient means for pressing the cover down upon the container, means for slidably mounting said container within the cooling chamber so that it may be moved into and out of the same, said cover and resilient means maintaining their respective positions within the cooling chamber when the container is moved out.

8. A refrigerator comprising a cooling chamber provided with a door, a container adapted to be filled with a cooling medium, means for slidably mounting the container in the chamber so that it may be projected through said door, spring means automatically engaging the container to prevent backsliding thereof when projected from the chamber, and means on the wall of the container and operable by the tilting of the container to release said spring means and permit the container to be returned into the chamber.

9. A refrigerator comprising a cooling chamber, a container slidably mounted in the chamber and adapted to be filled with a cooling medium, a door to the chamber through which the container may be projected, means for locking the container against complete removal from the chamber, and means secured to the cooling chamber and automatically engaging the container to prevent backsliding thereof when projected from the chamber, said container being movable to release said engaging means so that the container may be returned into the chamber.

10. A refrigerator comprising, in combination, a cooling chamber, a container for a cooling medium movably mounted in the chamber and adapted to be projected through an opening therein, automatic locking means for engaging the container while in the projected position, and means on the container for releasing said locking means automatically upon movement of the container.

11. A refrigerator comprising a cooling chamber having an opening provided with a door, a container adapted to be filled with cooling medium, means for slidably mounting the container within the chamber and adapted to be projected through said opening when said door is open, and a cover for the top of the container yieldingly held within the chamber independently of the container.

12. A refrigerator comprising a cooling chamber having an opening provided with a door, a container adapted to be filled with a cooling medium, means for slidably mounting the container within the chamber and adapted to be projected through said opening when said door is open, and means for holding the container against complete removal from the chamber, said means consisting of a pawl mounted at the rear end of the container and adapted to engage a fixed part of the chamber, and a rod mounted on the container to operate the pawl when the container is drawn out.

13. A refrigerator comprising a cooling chamber, a container adapted to be filled with a cooling medium, means for slidably mounting the container in the chamber, said container adapted to be projected through an opening of the chamber, means automatically engaging the container when in its projected position to prevent the return of the container within the chamber, and means automatically operated by the tilting of the container for releasing the last-mentioned means to permit the container to be returned within the chamber.

14. A refrigerator comprising a cooling chamber, a container adapted to be filled with a cooling medium, means for slidably mounting the container in the chamber, said container adapted to be projected through an opening in the chamber, means for locking the container against complete removal from the chamber, means automatically engaging the container to prevent the return of the container within the chamber, and means automatically operated by the tilting of the container for releasing the last-mentioned means to permit the container to return within the chamber, said first-mentioned locking means being manually releasable to permit entire removal of said container from the chamber.

15. A refrigerator comprising a cooling chamber, a container adapted to be filled with a cooling medium, means for slidably mounting the container in the chamber, said container adapted to be projected through an opening in the compartment, a spring automatically engaging the container when in its projected position to prevent its return, and means provided on the container brought into action by tilting the container to depress the spring and permit the container to be returned to the chamber.

16. A refrigerator comprising a cooling chamber, a casing slidably mounted within the chamber, a container within the casing adapted to contain a cooling medium, tracks secured to the walls of the chamber, rollers mounted on the casing adapted to ride on the tracks, other rollers mounted on the chamber below the first-mentioned rollers, tracks mounted on the casing and engaging the last-mentioned rollers and cooperating with the first-mentioned rollers and tracks for slidably supporting the casing within the chamber.

17. A refrigerator comprising a cooling chamber, a casing mounted within the chamber, a container having corrugated walls and adapted to contain a cooling medium, means for retaining the fluid within the container, whereby ice floating on the fluid and positioned at the top of the container will form the coldest region of the cooling chamber, said corrugated walls of the container forming with the casing flues for the downward circulation of air, a counter in open communication with the top and bottom of the cooling chamber for the circulation of air between the counter and the cooling chamber, a heat insulating partition between the counter and cooling chamber and spaced from the top and bottom walls to provide said open communication, the warm air from a high region of the counter passing downwardly through said flues and out from the bottom of the chamber to the lower portion of the counter, said counter having a top inclined upwardly towards the upper opening leading from the upper end of the counter to the cooling chamber for directing the air from the counter towards the cooling chamber.

18. A refrigerator comprising a cooling chamber, a casing mounted within the chamber, a container adapted to contain a cooling medium whereby ice floating on the fluid at the top of the container will form the coldest region of the cooling chamber, said container having corrugated walls which with the casing form flues for the downward circulation of air, a counter in open communication with the top and bottom of the cooling chamber for the circulation of air between the counter and the cooling chamber, the warm air from a high region of the counter passing downwardly through said flues and out from the bottom of the chamber to the lower portion of the counter, said counter having a glass top inclined upwardly towards the upper opening leading from the upper end of the counter to the cooling chamber for directing the air from the counter towards the cooling chamber.

19. A refrigerator comprising a cooling chamber, a container having corrugated walls and adapted to be filled with a cooling medium, a casing surrounding said corrugated walls and forming therewith flues for the circulation of air through the cooling chamber, a valve controlled perforated drain pipe located in a convex portion of the front end of the corrugated wall of the container, and means cooperating with said convex portion to confine and likewise protect the perforated pipe from injury by the ice.

20. A refrigerator comprisng a cooling chamber, a casing slidably mounted within the chamber, a container adapted to be filled with cooling medium removably mounted within the casing, said casing adapted to be projected through an opening in the chamber, a pawl on the casing adapted to engage means mounted on the side walls of the chamber adjacent the opening in the chamber for preventing a complete removal of the casing from the chamber, and rods pivotally mounted on the walls of the chamber and engaging pins on the sides of the casing for supporting the casing in its projected position from the chamber.

21. A refrigerator comprising a cooling chamber, a casing slidably mounted within the chamber, a container adapted to be filled with cooling medium removably mounted within the casing, said casing adapted to be projected through an opening in the chamber, and spring means mounted in the chamber and automatically coacting with the rear wall of the casing when said casing is projected from the chamber to prevent backsliding of the casing.

22. A refrigerator comprising a cooling chamber, a casing slidably mounted within the chamber, a container adapted to be filled with cooling medium removably mounted within the casing, said casing adapted to be projected through an opening in the chamber, spring means mounted in the chamber and automatically coacting with the rear wall of the casing when said casing is projected from the chamber to prevent backsliding of the casing, and a flange projecting outwardly from the rear wall of the casing for maintaining the spring means in engagement with the rear wall of the casing and adapted when the front end of the casing is raised to automatically disengage the spring from the rear wall of the casing to permit the casing to be returned within the chamber.

In testimony that we claim the foregoing as our own, we have hereto affixed our signatures.

REMER RAIMOND REID.
FREDERICK NEUDORFF.